A. WALLACE.
ELECTRIC LOCOMOTIVE.
APPLICATION FILED JAN. 11, 1921.

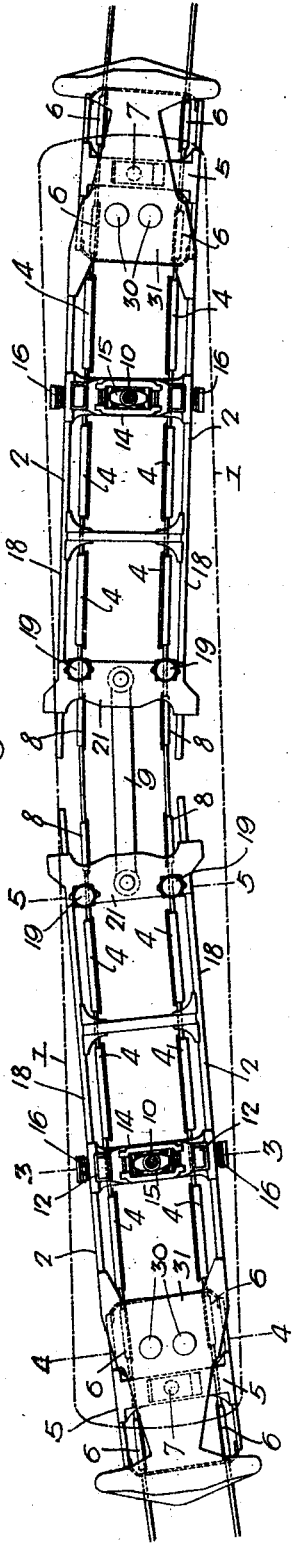

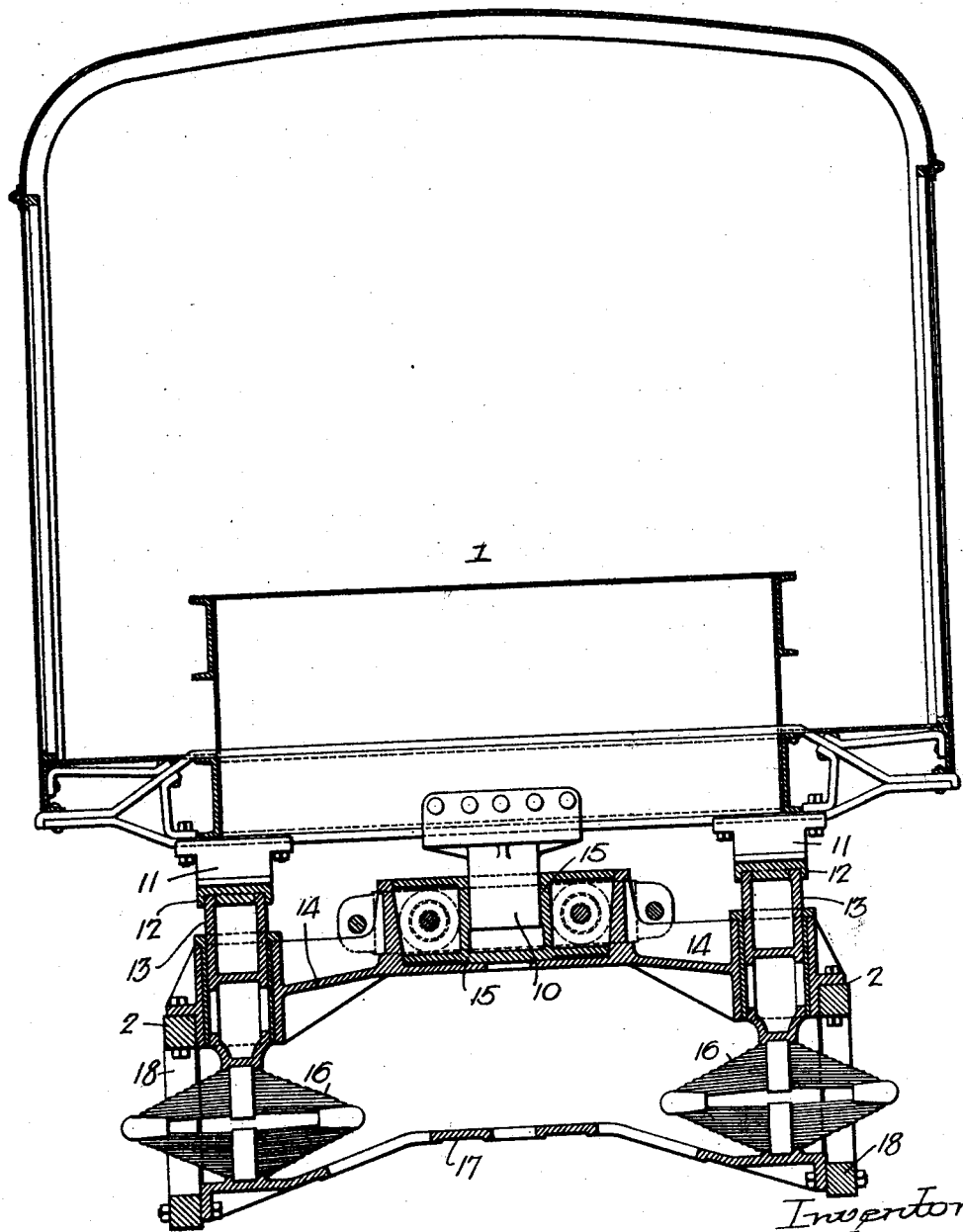

1,411,142.

Patented Mar. 28, 1922.
3 SHEETS—SHEET 3.

Inventor Allen Wallace.
by his Attorneys.

UNITED STATES PATENT OFFICE.

ALLEN WALLACE, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

ELECTRIC LOCOMOTIVE.

1,411,142.  Specification of Letters Patent.  Patented Mar. 28, 1922.

Application filed January 11, 1921. Serial No. 436,484.

*To all whom it may concern:*

Be it known that I, ALLEN WALLACE, a citizen of the United States, residing in Moorestown, New Jersey, have invented certain Improvements in Electric Locomotives, of which the following is a specification.

My invention relates to certain improvements in electric locomotives of the type in which the cab of the locomotive extends over two trucks, which are connected together independently of the cab.

The object of the invention is to provide a series of side bearings for the cab so arranged that the heavy springs are located at the pivot of the trucks, while the light springs are located at the end of each truck, the light springs taking the light loads. When the load is increased, the springs at the pivots take the load.

This object I attain in the following manner, reference being had to the accompanying drawings, in which:

Fig. 1 is a side view of an electric locomotive, illustrating my invention;

Fig. 2 is a plan view, showing the two trucks in full lines and the cab in dotted lines, and also illustrating the locomotive passing over a curved track;

Fig. 3 is a sectional view on the line 3—3, Fig. 2, drawn to an enlarged scale.

Figure 4:
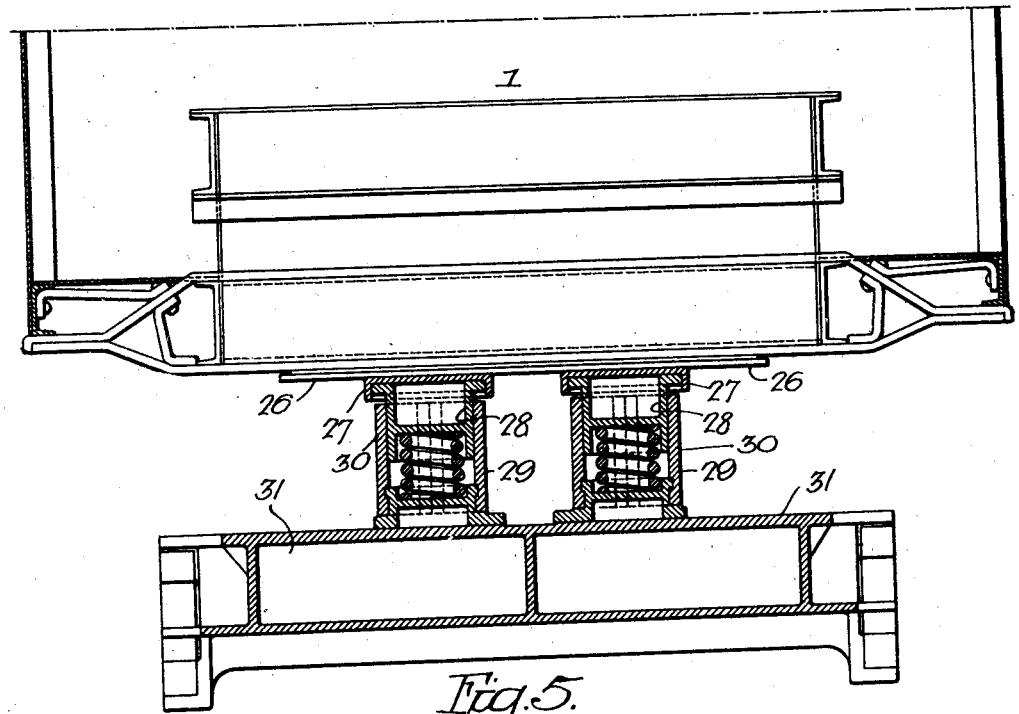
Fig. 4 is a sectional view on the line 4—4, Fig. 2.

1 is the cab of an electric locomotive. 2, 2 are the trucks. These trucks have side frames, as shown, and mounted in bearings in the trucks are the axles 3 for the driving wheels 4. These driving wheels are motor driven in the ordinary manner. At the outer end of each truck, in the present instance, is a pivoted pilot truck 5, in which the axles for the wheels 6 find their bearing. The trucks are pivoted to the frame of the main truck at 7. At the inner end of each truck are bearings for the axles of trailer wheels 8.

It will be understood that the design of the two trucks may vary, according to the type of locomotive desired, and that the number of driving wheels may be increased or diminished without departing from the essential features of the invention.

The two trucks are connected together by a long draw bar 9, in the present instance, so that each truck is free to accommodate itself to any curves in the track.

In Fig. 2, for instance, I have shown the locomotive passing around a comparatively sharp curve.

It will be noticed that the cab of the locomotive is substantially the same length as the two trucks, and, as the trucks are pivoted to the cab at 10, the cab assumes the position illustrated by dotted lines in Fig. 2, as the trucks pass around the curve. In order to support the cab properly on the trucks, I provide side bearings on the transverse center line of each truck, and I also provide side bearings at each end of each truck. The side bearings at the center line of the truck are much heavier than those at the ends and are for the purpose of sustaining the heavy loads. The detail construction of these bearings is clearly shown in Fig. 3.

The cab 1 has side bearing plates 11 at each side of the center pivot pin 10 and bearing against these side bearing plates are plates 12 carried by plungers 13 adapted to openings in the frame 14, which carries the center bearing 15 for the pivot pin 10. The lower ends of each plunger 13 rest upon a double elliptical spring 16 mounted on a lower portion 17 of the frame 14 secured to the side frames 18 of the truck so that the weight of the cab is taken by two sets of elliptical springs as the pivot center of each truck.

Figure 5:
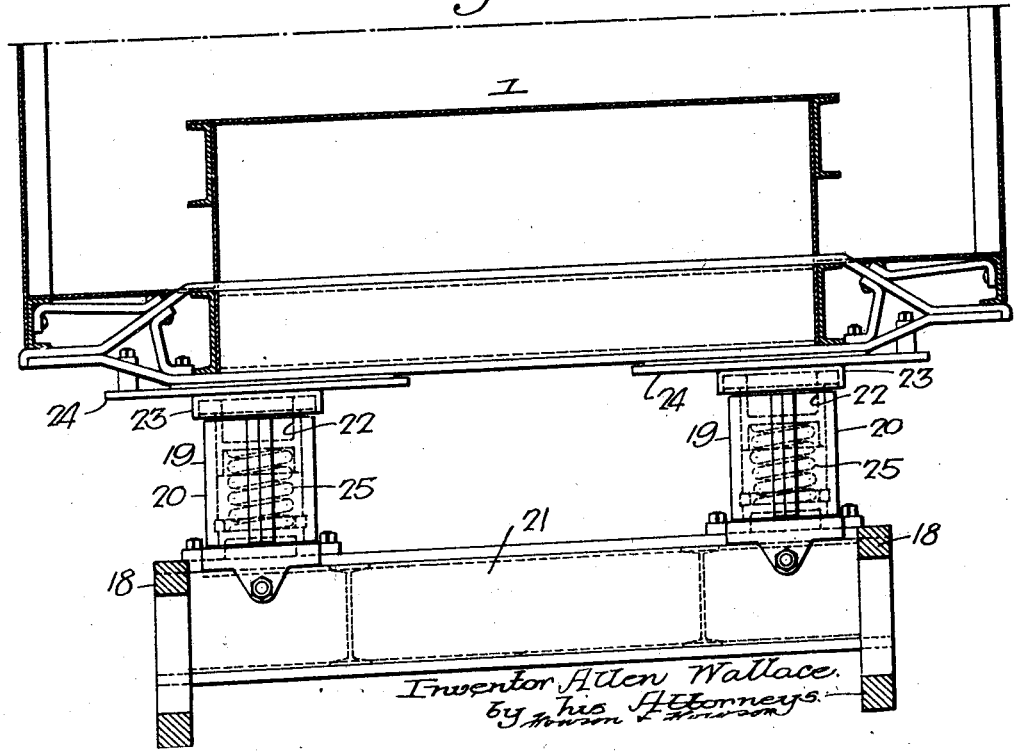
Fig. 5 is a sectional view on the line 5—5, Fig. 2.

At the inner end of each truck are two side bearings 19 spaced a considerable distance apart, as shown in Fig. 5. These side bearings consist of casings 20 mounted on the cross bar 21 of the truck frames 18. Within each casing is a plunger 22 having a bearing plate 23, which rests against an extended plate 24 on the under side of the cab. A coiled spring 25 is located in each casing and tends to force the plunger in contact with the bearing plate 24. By making the plate extended, the trucks can swing on their pivots without the plungers moving away from their plates. At the outer end of each truck are bearings 30, which are arranged close together, as shown in Figs. 2 and 4, so that they will be always under the ends of the cab. Secured to the under side of the cab is a plate 26 against which the bearing plates 27 rest. These plates are carried by plungers 28 located within the casing 29. The construction of the bearings 30 is similar to the construction of the bearings 19, the only difference being that they are placed closer together, while the others are spaced apart. The bearings 30 are mounted on a cross bar 31 of the side frames. The particular construction of the center bearings is fully set forth and claimed in a co-pending application filed by Kenneth Rushton on the eighth day of Jan., 1921, under Serial No. 435,844.

It will be seen by the above construction that the weight of the cab is taken by the heavy springs in line with the pivot center of each truck and that any vertical movement on the trucks is absorbed by the springs at the ends of the trucks so that the locomotive will ride evenly on the rails and the cab will be properly balanced.

It will be understood that the cab of an electric locomotive carries mechanism which is of considerable weight, so that the cab should be supported on the trucks by the side bearings in order to avoid any undue jars, owing to the movement of the locomotive over the tracks.

I claim:

1. The combination in an electric locomotive, of two trucks; a cab extending over both trucks; a pivot connecting the cab with the center of each truck; side bearing spring members on a line with the center pivots; and yielding bearings at the end of each truck resting against the under side of the cab.

2. The combination in an electric locomotive, of two trucks connected together; a cab extending over both trucks; pivots by which each truck is pivotally connected to the cab; side bearing springs at each side of each pivot; and spring bearings located at each end of each truck and bearing against the under side of the cab, the bearing springs at the center being heavier than those at the ends of the trucks.

3. The combination in an electric locomotive, of two trucks; a draw bar connecting the trucks; a cab extending over both trucks; a center pivot by which each truck is connected to the cab; double elliptical side bearing springs carried by each truck on a transverse line through the pivot; side plungers resting on the springs; said plungers bearing against the under side of the cab; end bearings at each end of the truck, each consisting of a casing; a plunger; and a coiled spring within the casing supporting the plunger, the springs of the center bearings being heavier than the springs of the end bearings.

4. The combination of two trucks; a draw bar connecting the trucks; a cab extending over both trucks; a center pivot by which each truck is pivotally mounted under the cab; two heavy side bearing springs at the center of each truck bearing upon the under side of the cab at each side of each pivot; a pair of end bearing springs on each truck arranged close together and bearing upon the under side of the cab; and end bearing springs on the inner end of each truck spaced a greater distance apart than the other end bearings and also bearing against the under side of the cab.

ALLEN WALLACE.